(12) United States Patent
Lee (10) Patent No.: US 9,707,890 B2
(45) Date of Patent: Jul. 18, 2017

(54) AUTOMOBILE CAMERA MODULE, METHOD OF DRIVING THE SAME AND METHOD OF GUIDING PARKING

(75) Inventor: Sangyong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 675 days.

(21) Appl. No.: 13/985,062

(22) PCT Filed: Jul. 22, 2011

(86) PCT No.: PCT/KR2011/005408
§ 371 (c)(1),
(2), (4) Date: Aug. 13, 2013

(87) PCT Pub. No.: WO2012/111889
PCT Pub. Date: Aug. 23, 2012

(65) Prior Publication Data
US 2013/0321616 A1 Dec. 5, 2013

(30) Foreign Application Priority Data
Feb. 16, 2011 (KR) .................... 10-2011-0013888

(51) Int. Cl.
*H04N 7/18* (2006.01)
*B60Q 9/00* (2006.01)
*B62D 15/02* (2006.01)

(52) U.S. Cl.
CPC ........... *B60Q 9/005* (2013.01); *B62D 15/028* (2013.01); *B62D 15/0275* (2013.01)

(58) Field of Classification Search
CPC ..... B62D 15/027; B62D 15/026; B60Q 9/005

USPC ...... 348/118, 113, 119, 135; 340/932.2, 937; 701/41; 180/204
See application file for complete search history.

(56) References Cited

U.S. PATENT DOCUMENTS

| | | | |
|---|---|---|---|
| 6,344,805 B1 | 2/2002 | Yasui et al. | |
| 7,024,286 B2 | 4/2006 | Kimura et al. | |
| 7,366,595 B1* | 4/2008 | Shimizu | B60K 35/00 340/937 |
| 2001/0026317 A1 | 10/2001 | Kakinami et al. | |
| 2004/0153243 A1* | 8/2004 | Shimazaki | B62D 15/0275 701/300 |
| 2005/0264432 A1* | 12/2005 | Tanaka | B60Q 9/004 340/932.2 |

(Continued)

FOREIGN PATENT DOCUMENTS

| | | |
|---|---|---|
| EP | 1065642 A2 | 1/2001 |
| EP | 1442962 A2 | 8/2004 |
| EP | 1510440 A2 | 3/2005 |

(Continued)

OTHER PUBLICATIONS

LG Innotek, "Improved parking support camera system", Feb. 16-18, 2011, 3 pages.

*Primary Examiner* — Jefferey Harold
*Assistant Examiner* — Jean W Desir
(74) *Attorney, Agent, or Firm* — Birch, Stewart, Kolasch & Birch, LLP (57) ABSTRACT

The present invention relates to an automobile camera module by which an estimated traveling trace can be grasped to prevent fender-bender (minor collision) with a parked vehicle to reduce inconvenience and time loss caused by a parking failure.

19 Claims, 5 Drawing Sheets

(56) References Cited

U.S. PATENT DOCUMENTS

2008/0158011 A1    7/2008   Yamanaka
2010/0100270 A1    4/2010   Kuo et al.

FOREIGN PATENT DOCUMENTS

| JP | 2001-10432 A | 1/2001 |
| JP | 2004-123057 A | 4/2004 |
| JP | 2008-162426 A | 7/2008 |
| JP | 2003-72495 A | 4/2009 |
| JP | 2010-42811 A | 2/2010 |
| KR | 10-2004-0089476 A | 10/2004 |
| KR | 10-2007-0041973 A | 4/2007 |
| KR | 10-0894618 B1 | 4/2009 |
| WO | WO 2011/014482 A1 | 2/2011 |

* cited by examiner

AUTOMOBILE CAMERA MODULE, METHOD OF DRIVING THE SAME AND METHOD OF GUIDING PARKING

TECHNICAL FIELD

The teachings in accordance with the exemplary embodiments of this invention relate generally to an automobile camera module, a method of driving the same and a method of guiding parking, and more particularly to an automobile camera module, a method of driving the same and a method of guiding parking, capable of inducing an easy parking by displaying an estimated traveling trace in real time based on a steering angle.

BACKGROUND ART

Vehicles have been recently developed to provide traveling performance safety and various conveniences. A number of sensors are provided inside and/or outside of a chassis so that it is possible to sense an external surrounding environment even in the vehicle.

As one of safety and convenience systems, parking assistant systems have been provided a function for displaying an image photographed by a camera together with a vehicle traveling trace, thereby allowing the driver to estimate a direction in which the vehicle moves, which helps an inexperienced novice or a senior citizen back-in park easily.

However, a scheme for providing a rear image together with the vehicle traveling trace has a problem in that, because patterns (spots, lines, surfaces and coordinates) by which a traveling direction is displayed are stored in an external storage unit (RAM, ROM), and information thereof is combined with an image obtained by a camera and the combined information is displayed on a display device, manufacturing costs are increased due to complex device configuration involving the external storage units.

DISCLOSURE OF INVENTION

Technical Problem

The present invention is directed to solve at least one or more of the aforementioned problems in whole or in part and to provide an automobile camera module, a method of driving the same and a method of guiding parking capable of inducing an easy parking by displaying an estimated traveling trace in real time based on a steering angle.

Technical problems to be solved by the present invention are not restricted to the above-mentioned, and any other technical problems not mentioned so far will be clearly appreciated from the following description by skilled in the art.

Solution to Problem

An object of the invention is to overcome at least one or more of the above problems and/or disadvantages in whole or in part, and/or provide at least the advantages described hereinafter, and/or make improvements in the prior art. In order to achieve at least the above objects, in whole or in part, and in accordance with the purposes of the invention, as embodied and broadly described, and in one general aspect of the present invention, there is provided an automobile camera module, the module comprising: a memory stored with a vehicle parking guide line and a parking site; an image sensor composing the image stored in the memory with a photographed image; a controller generating an estimated traveling trace of a vehicle to the parking site by transmitting a steering angle information of the vehicle; and an image composition unit composing the composite image received from the image sensor with the estimated traveling trace received from the controller.

Preferably, the controller receives the steering angle information in real time to generate an estimated traveling trace.

Preferably, the memory further stores a parking mode, a parking direction and a warning message.

Preferably, the controller receives the steering angle information of a vehicle in real time by a Controller Area Network (CAN) communication with a communication unit.

Preferably, the communication unit receives the steering angle information forthright from a steering angle measurement unit including a steering angle sensor.

Preferably, the image sensor is installed on any one of a front area, a rear area or both areas of the vehicle.

Preferably, the image composition unit is connected to a display unit for displaying the composite image received from the image sensor and the estimated traveling trace received from the controller.

Preferably, the image composed by the image composition unit is converted to an analogue signal by a DAC (Digital-to-Analogue Converter) and the converted signal is outputted to the display unit.

Preferably, the estimated traveling trace is displayed on the display unit in a polygonal shape or a direction indicating shape.

Preferably, the estimated traveling trace is altered in real time in response to changing steering angles of the vehicle.

Preferably, the image sensor converts a digital signal to an analogue signal.

Preferably, the image composed by the image composition unit is converted to the analogue signal through the image sensor, and outputted to the display unit through an amplifier.

In another general aspect of the present invention, there is provided a method for driving an automobile camera module, the method comprising: photographing an image of a vehicle using an image sensor; composing, by the image sensor, an image stored in a memory and the photographed image; receiving, by a controller, steering angle information of the vehicle to generate an estimated traveling trace of the vehicle; and composing the image composed by the image sensor with the estimated vehicle trace generated by the controller.

Preferably, the image sensor photographs an image from a front image, a rear image or both images of the vehicle.

Preferably, the method further includes outputting the image composed by the image composition unit to a display unit.

Preferably, the estimated traveling trace is altered in real time in response to changing steering angles of the vehicle and the altered trace is outputted to the display unit.

Preferably, a color in which the estimated traveling trace matches a parking guide line and a color in which the estimated traveling trace does not match the parking guide line are different.

In still another general aspect of the present invention, there is provided a method for guiding a parking, the method comprising: selecting any one parking mode from a parallel parking mode and a right angle parking mode; selecting a parking site based on the selected parking mode; outputting parking guide line information corresponding to the selected parking site and estimated traveling trace information of the vehicle; and outputting progressing position information based on back and forth movement of the vehicle.

Preferably, the estimated traveling trace of the vehicle alters and outputs the estimated traveling trace information of the vehicle in real time in response to changing steering angle of the vehicle.

Preferably, color information on the estimated traveling trace is changed and outputted if the parking guide line and the estimated traveling trace are matched.

Advantageous Effects of Invention

The automobile camera module according to the present invention has an advantageous effect in that front and rear images of a vehicle, a parking guide line of the vehicle, an image of parking site of the vehicle and an estimated traveling trace of the vehicle are displayed on a display unit when a driver parks the vehicle, to allow the driver to accurately park the vehicle while viewing the estimated traveling trace of the vehicle.

The automobile camera module according to the present invention has another advantageous effect in that a driver can adjust a steering wheel to prevent an estimated traveling trace of a vehicle from deviating from a parking guide line and a parking site of the vehicle if the estimated traveling trace of the vehicle deviates from the parking guide line and the parking site of the vehicle, to thereby reduce inconvenience and time loss caused by a parking failure.

The automobile camera module according to the present invention has still another advantageous effect in that an estimated traveling trace of a vehicle can be grasped to prevent fender-bender (minor collision) with a parked vehicle.

The present invention has still further advantageous effect in that a controller can calculate an estimated traveling trace of a vehicle in real time to reduce complexity of the system and to increase a processing speed, whereby manufacturing costs can be reduced by processes using a relatively small-sized memory.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description.

It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof may be used in the detailed description and/or the claims to denote non-exhaustive inclusion in a manner similar to the term "characterized by".

Furthermore, "exemplary" is merely meant to mean an example, rather than the best. It is also to be appreciated that features, layers and/or elements depicted herein are illustrated with particular dimensions and/or orientation relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

As used in the specification and in the claims, the singular form of "a", "an", and "the" include plural referents unless the context clearly dictates otherwise.

Figure 1:
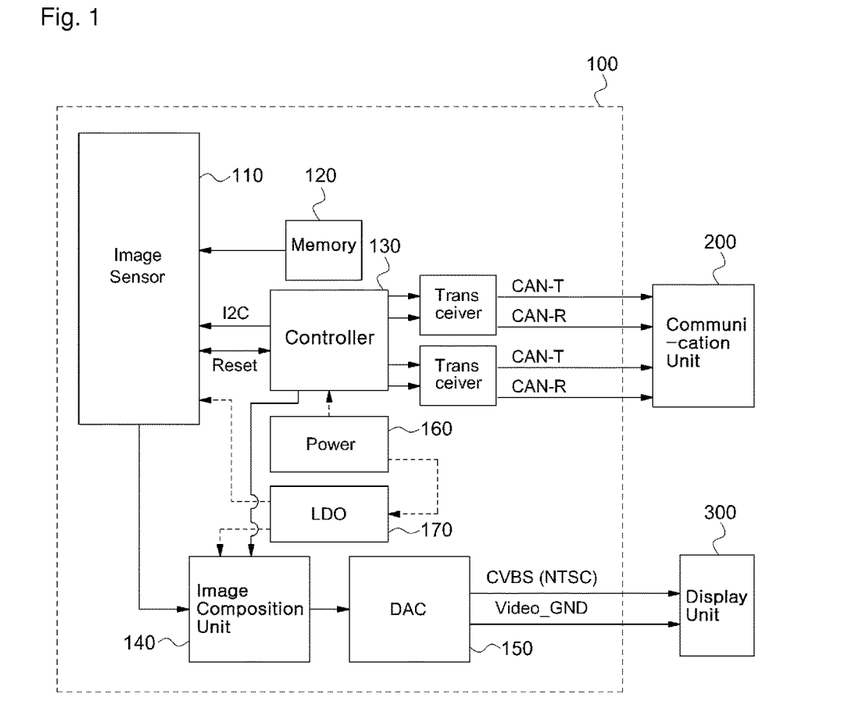
FIG. 1 is a block diagram illustrating a parking camera module according to an exemplary embodiment of the present invention.
Figure 2:
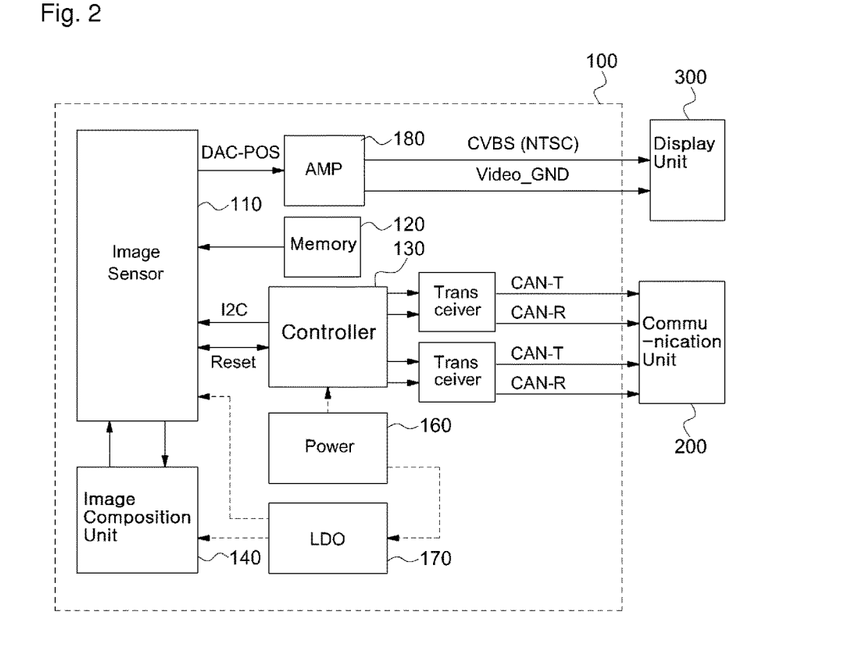
FIG. 2 is a block diagram illustrating a modified parking camera module according to an exemplary embodiment of the present invention.
Figure 3:
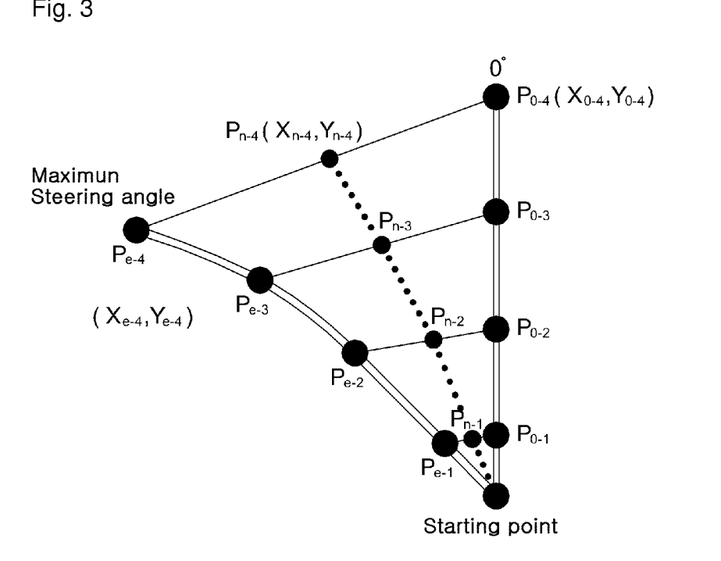
FIG. 3 is a schematic conceptual view illustrating a method of calculating an estimated traveling trace of a vehicle according to an exemplary embodiment of the present invention.

FIG. 1 is a block diagram illustrating a parking camera module according to an exemplary embodiment of the present invention, FIG. 2 is a block diagram illustrating a modified parking camera module according to an exemplary embodiment of the present invention, and FIG. 3 is a schematic conceptual view illustrating a method of calculating an estimated traveling trace of a vehicle according to an exemplary embodiment of the present invention.

An automobile camera module according to an exemplary embodiment of the present invention includes a memory (120) stored with a vehicle parking guide line and a parking site; an image sensor (110) composing the image stored in the memory (120) with a photographed image; a controller (130) generating an estimated traveling trace of a vehicle to the parking site by transmitting steering angle information of the vehicle; and an image composition unit (140) composing the composite image received from the image sensor (110) with the estimated traveling trace received from the controller (130).

Now, operation of the automobile camera module (100) will be described. In a case a driver parks a vehicle, the image sensor (110) photographs an image of the vehicle and compose the photographed image with the image stored in the memory (120). The controller (130) receives steering angle information of the vehicle that is changed in response to adjustment of a steering wheel by a driver to generate an estimated traveling trace of the vehicle.

Thereafter, the image composition unit (140) composes the composite image received from the image sensor (110) with the estimated traveling trace of the vehicle received from the controller (130). At this time, the automobile camera module (100) outputs an image including the estimated traveling trace of the image composition unit (140) to a display unit (300).

Therefore, the automobile camera module according to the present invention has an excellent advantage in that front and rear images of a vehicle, a parking guide line of the vehicle, an image of parking site of the vehicle and an estimated traveling trace of the vehicle are displayed on a display unit (300) when a driver parks the vehicle, to allow the driver to accurately park the vehicle while viewing the estimated traveling trace of the vehicle.

That is, the automobile camera module according to the present invention is configured in such a manner that the driver can adjust the steering wheel to keep the vehicle to stay within the parking guide line and the parking site if the estimated traveling trace of the vehicle deviates from the parking guide line and the parking site, thereby reducing inconvenience and time loss caused by a parking failure.

The automobile camera module according to the present invention has another advantage in that an estimated traveling trace of a vehicle can be grasped to prevent fender-bender (minor collision) with a parked vehicle.

The automobile camera module according to the present invention may further include a parking mode selector (not shown) capable of selecting parking modes such as a parallel parking and a right angle parking, where a signal selected by the parking mode selector is inputted to the controller (130) which in turn outputs the parking guide line image and the parking site image stored in the memory (120) in response to the selected parking mode to the image sensor (110).

The memory (120) is embedded in the camera module (100) to transmit the stored information of the memory (120) to the image sensor (110). The memory (120) may be a flash memory in which images such as a parking mode, a parking direction, a parking guide line, a parking site and a warning message can be stored. The parking guide line in the images may be stored in various images based on parking modes (parallel parking, right angle parking) or parking directions (left hand side or right hand side).

However, the present invention may have an advantage of reducing a product cost due to relatively small number of stored images and a low memory capacity because only one selected parking guide line image is provided instead of images that are continuously changing in response to changed steering angles.

The image sensor (110) is installed on one of a front, a rear and both the front and the rear side of the vehicle to allow photographing only one image from the front, the rear and the both during parking, where at least one or more of the parking mode, the parking direction, the parking guide line, the parking site and the warning message stored in the memory (120) are composed, and the composite guide image can be converted to an image signal.

The controller (130) may receive steering angle information and speed information of a vehicle in real time by a Controller Area Network (CAN) communication with a communication unit (200). The controller (130) may be so connected as to enable data transmission/reception with the image sensor (110) through I2C communication.

The controller (130) generates an estimated traveling trace based on steering angle information received from the communication unit (200).

Referring to FIG. 3, first, many coordinates are generated based on maximum steering angle (i.e., 540° or 720°) traveling trace (traveling trace when the steering wheel is maximally turned) and minimum steering angle traveling trace (linear traveling trace when the steering wheel is not turned) in consideration of vehicular characteristic during camera-ON operation.

For example, as illustrated in FIG. 3, when a driver turns the steering wheel to a predetermined steering angle between the maximum steering angle and the minimum steering angle, such coordinates as 'Pn-1', 'Pn-2', 'Pn-3' and 'Pn-4' may be calculated, and dotted lines formed by connection of the coordinates can be the estimated traveling trace.

At this time, the communication unit may be so configured as to forthright receive the steering angle information from a steering angle measurement device included with a steering angle sensor. The steering angle information may be received from an equivalent device equipped on a vehicle capable of receiving the steering angle information. At this time, the steering angle sensor measures a steering level of a steering wheel necessary for controlling a traveling vehicle.

Thereafter, the controller receives the steering angle information in real time in a communication scheme of Controller Area Network (CAN) to calculate coordinates in proportion to the traveling trace of the maximum steering angle, connects each coordinate and generates the estimated traveling trace.

To be more specific, an x coordinate and a y coordinate of the estimated traveling trace may be defined by the following Equations (exemplified in a case where a parking end point is 4 points).

$$xn\text{-}4 = x0\text{-}4 - \Delta x \quad \text{[Equation 1]}$$

$$yn\text{-}4 = y0\text{-}4 - \Delta y \quad \text{[Equation 2]}$$

where, variation ($\Delta x$) of x coordinate is (x0-4−xe-4)/($\theta c/\theta m$), variation ($\Delta y$) of y coordinate is (y0-4−ye-4)/($\theta c/\theta m$), and where $\theta m$ is a maximum steering angle and $\theta c$ is a current steering angle.

The image composition unit (140) may be configured with overlay chips. The image composition unit (140) may receive a guide image-composed image from the image sensor (110), receives the estimated traveling trace information from the controller (130) and compose the guide image-composed image with the estimated traveling trace information, which is converted to an analog signal by a DAC (Digital to Analog Converter) and transmitted to the display unit (300).

The configuration of the image composition unit (140) is not limited thereto. Alternatively, an image displayed with the guide image by the controller (130) and the estimated traveling trace may be composed. However, the alternative method may create a problem of increasing the size of the controller (130) and lengthening a process time. Therefore, it is preferable that a separate image composition unit be installed.

Furthermore, as illustrated in FIG. 2, in a case the image sensor (110) itself is an image sensor (Product Name: MT9V126, 128) capable of converting a digital signal to an analog signal, the image composed by the image composition unit (140) may be converted to an analog signal through the image sensor (110) to be displayed on the display unit (300) through an amplifier (180).

MODE FOR THE INVENTION

Figure 4:
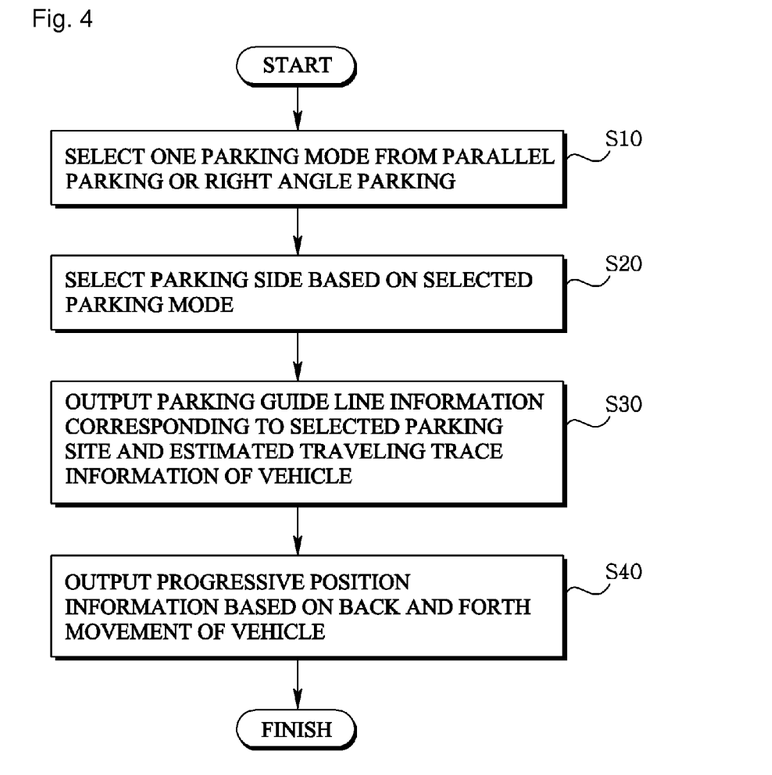
FIG. 4 is a flowchart illustrating a process of inducing a parking according to an exemplary embodiment of the present invention.

FIG. 4 is a flowchart illustrating a process of inducing a parking according to an exemplary embodiment of the present invention, and FIGS. 5a through 5e are schematic views illustrating a process of inducing a parking for each step according to an exemplary embodiment of the present invention.

A method for driving an automobile camera module according to an exemplary embodiment of the present invention includes: selecting any one parking mode from a parallel parking mode and a right angle parking mode (S10); selecting a parking site based on the selected parking mode (S20); outputting parking guide line information corresponding to the selected parking site and estimated traveling trace information of the vehicle (S30); and outputting progressing position information based on back and forth movement of the vehicle (S40).

Figure 5A:
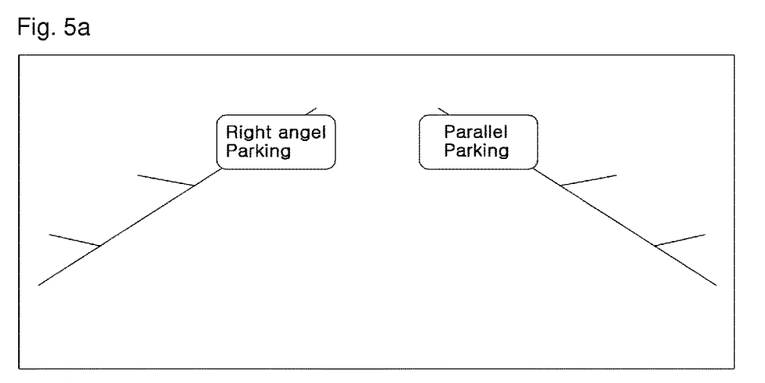
FIGS. 5a through 5e are schematic views illustrating a process of inducing a parking for each step according to an exemplary embodiment of the present invention.

First, the step (S10) of selecting any one parking mode from a parallel parking mode and a right angle parking mode is to output a parallel parking image and a right angle parking image on a screen of the display unit as shown in FIG. 5a.

Figure 5B:
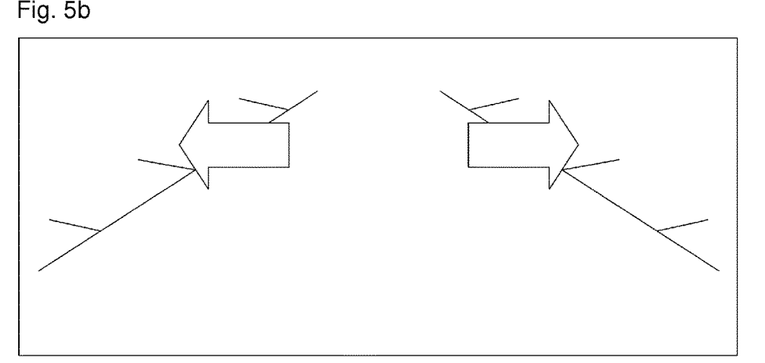

The step (S20) of selecting a parking site based on the selected parking mode is to output parking direction information corresponding to the parking mode if the parking mode is selected. For example, as illustrated in FIG. 5b, in a case the right angle parking is selected, a screen of a left hand side image or a right hand side image is shown on the screen and one of the two images may be selected.

Figure 5C:
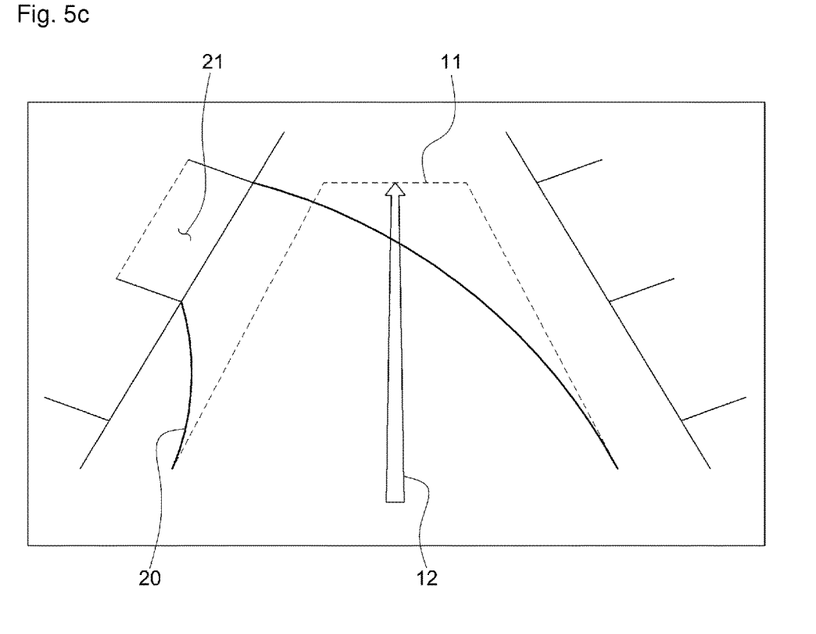

In the step (S30) of outputting parking guide line information corresponding to the selected parking site and estimated traveling trace information of the vehicle, a parking guide line (20) and a parking site (21) connected to an end of the parking guide line (20) are displayed and an estimated moving trace (11) responsive to a steering angle of current situation is displayed as shown in FIG. 5c.

The parking guide line (20) and the parking site (21) are a composition of the image stored in the memory and the photographed image, and provided as a fixed image. Thus, if the parking site does not match a site to be actually parked, the driver may move the vehicle back and forth to match the parking site image to the actual parking site image.

The estimated moving trace (11) may be displayed in a polygonal shape or a direction display shape. The polygonal shape for displaying the estimated moving trace (11) is preferably shown as a trapezoidal shape (11) for providing prospective to the driver, and direction display shape is preferably shown as an arrow (12), but the estimated moving trace (11) may be shown in various other shapes.

Figure 5D:
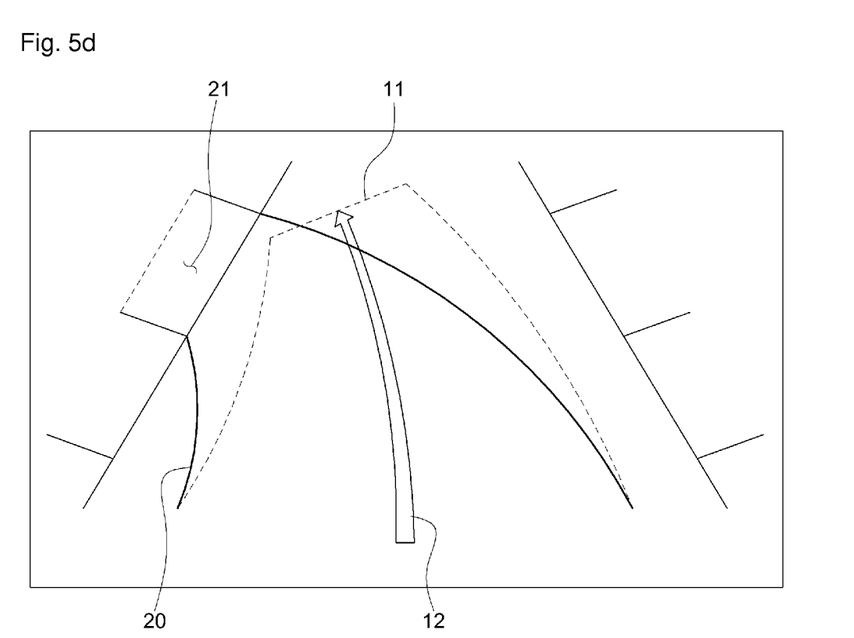

As shown in FIG. 5d, the estimated moving trace (11) is changed and outputted in real time in response to changing steering angles of the vehicle to allow the driver to accurately adjust the steering wheel for accurate parking. For example, every time the steering angle of the vehicle is changed more than 20°, an estimated moving trace can be displayed on the screen of the display unit.

Figure 5E:
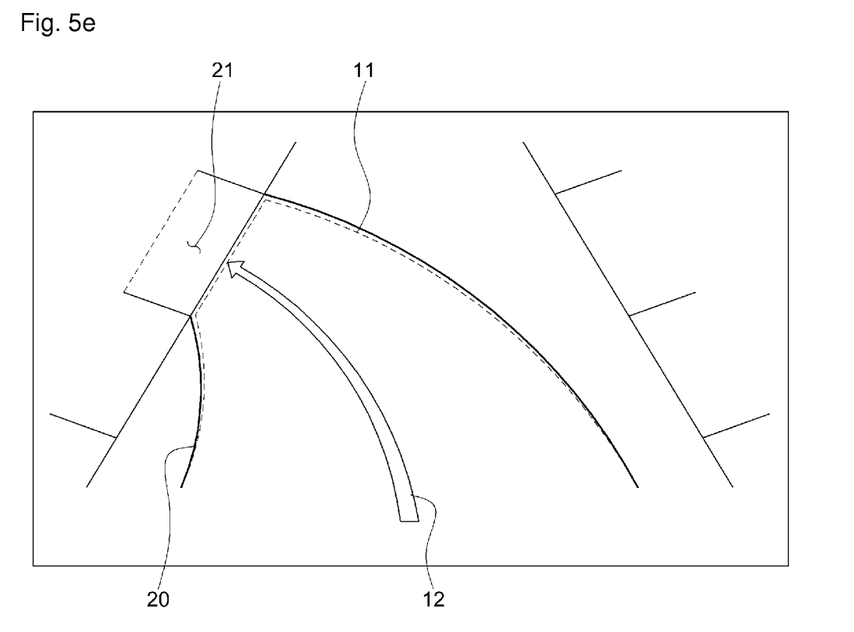

Successively, as shown in FIG. 5e, in a case the estimated moving trace (11) is matched to a parking guide line (20) by manipulation of the steering wheel, the driver can advance the vehicle to induce the parking. Thus, the parking can be advantageously and easily implemented by matching, by the driver, the estimated moving trace (11) to the parking guide line (20).

At this time, in a case the estimated moving trace (11) is matched to a parking guide line (20), the estimated moving traces are differently colored to allow the driver to recognize parkability. At this time, detailed colors may be variably changed based on driver preference and display specification.

That is, a color in which the estimated moving trace matches a parking guide line, and a color in which the estimated moving trace does not match the parking guide line may be mutually different. For example, in a case the estimated moving trace does not match the parking guide line, the estimated moving trace may be displayed in a first color of blue, and in a case the estimated moving trace matches the parking guide line, the estimated moving trace may be displayed in a second color of green.

Thereafter, the step (S40) of outputting progressing position information based on back and forth movement of the vehicle is to calculate distance information based on speed information as the driver performs the parking process of a vehicle, and display the distance information, where if the distance is zero, a stop sign may be displayed.

Figure 6:
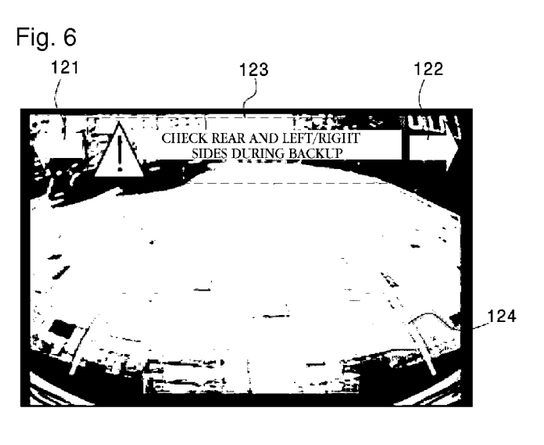
FIG. 6 is a photograph illustrating a screen of a display unit according to an exemplary embodiment of the present invention.

FIG. 6 is a photograph illustrating a screen of a display unit according to an exemplary embodiment of the present invention.

Referring to FIG. 6, the display unit inside the vehicle is displayed with a rear image, left/right hand side display buttons (121, 122), a warning message (123), a guide parking line (124) and a parking site, where the estimated moving trace may be displayed in a green arrow.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has industrial applicability in that front and rear images of a vehicle, a parking guide line of the vehicle, an image of parking site of the vehicle and an estimated traveling trace of the vehicle are displayed on a display unit when a driver parks the vehicle, to allow the driver to accurately park the vehicle while viewing the estimated traveling trace, the driver can adjust a steering wheel to prevent the estimated traveling trace from deviating from the parking guide line and the parking site of the vehicle if the estimated traveling trace deviates from the parking guide line and the parking site of the vehicle, to thereby reduce inconvenience and time loss caused by a parking failure, the estimated traveling trace can be grasped to prevent fender-bender (minor collision) with a parked vehicle, and a controller can calculate the estimated traveling trace in real time to reduce complexity of the system and to increase a processing speed, whereby manufacturing costs can be reduced by processes using a relatively small-sized memory.

The invention claimed is:

1. An automobile camera module, the module comprising:
    a memory stored with images of a vehicle parking guide line and a parking site;
    an image sensor composing the image stored in the memory with a photographed image;
    a controller generating an estimated traveling trace of a vehicle to the parking site by receiving steering angle information of the vehicle; and
    an image composition unit composing the composite image received from the image sensor with the estimated traveling trace received from the controller,
    wherein the memory further stores images of a parking mode, a parking direction, and a warning message,
    wherein the parking guide line in the images is based on the parking mode, and the images of the parking guide line and the parking site are provided as fixed images,
    wherein, when the image of the parking site and an actual parking site do not match, a driver can resolve by a steering action so that the image of the parking site and the actual parking site do match,
    wherein the controller calculates coordinates in proportion to a traveling trace of a maximum steering angle, connects each coordinate and generates the estimated traveling trace,
    wherein the image composition unit is configured with overlay chips, and the composite image is an image composed from the photographed image and the images of the parking guide line and the parking site, on which the estimated traveling trace is overlaid, and
    wherein, when the estimated traveling trace is matched to the parking guide line by manipulation of the steering wheel, the vehicle is parked according to the estimated traveling trace to the parking site.

2. The automobile camera module of claim 1, wherein the controller receives the steering angle information in real time to generate an estimated traveling trace.

3. The automobile camera module of claim 1, wherein the controller receives the steering angle information of a vehicle in real time by a Controller Area Network (CAN) communication with a communication unit.

4. The automobile camera module of claim 1, wherein the communication unit receives the steering angle information forthright from a steering angle measurement unit including a steering angle sensor.

5. The automobile camera module of claim 1, wherein the image sensor is installed on any one of a front area, a rear area or both areas of the vehicle.

6. The automobile camera module of claim 1, wherein the image composition unit is connected to a display unit for displaying the composite image received from the image sensor and the estimated traveling trace received from the controller.

7. The automobile camera module of claim 1, wherein the image composed by the image composition unit is converted to an analog signal by a DAC (Digital-to-Analog Converter) and the converted signal is outputted to the display unit.

8. The automobile camera module of claim 6, wherein the estimated traveling trace is displayed on the display unit in a polygonal shape or a direction indicating shape.

9. The automobile camera module of claim 1, wherein the estimated traveling trace is altered in real time in response to changing steering angles of the vehicle.

10. The automobile camera module of claim 1, wherein the image sensor converts a digital signal to an analog signal.

11. The automobile camera module of claim 10, wherein the image composed by the image composition unit is converted to the analog signal through the image sensor, and outputted to the display unit through an amplifier.

12. A method for driving an automobile camera module, the method comprising:
    photographing an image of a vehicle using an image sensor;
    composing, by the image sensor, images stored in a memory and the photographed image;
    receiving, by a controller, steering angle information of the vehicle to generate an estimated traveling trace of the vehicle; and
    composing the image composed by the image sensor with the estimated vehicle trace generated by the controller,
    wherein images stored in the memory include images of a parking mode, a parking direction, a parking guide line, a parking site and a warning message,
    wherein the parking guide line in the images is based on the parking mode, and the images of the parking guide line and the parking site are provided as fixed images,
    wherein, when the image of the parking site and an actual parking site do not match, a driver can resolve by a steering action so that the image of the parking site and the actual parking site do match,
    wherein the controller calculates coordinates in proportion to a traveling trace of a maximum steering angle, connects each coordinate and generates the estimated traveling trace,
    wherein the image composition unit is configured with overlay chips, and the composite image is an image composed from the photographed image and the images of the parking guide line and the parking site, on which the estimated traveling trace is overlaid, and
    wherein, when the estimated traveling trace is matched to the parking guide line by manipulation of the steering wheel, the vehicle is parked according to the estimated traveling trace to the parking site.

13. The method for driving an automobile camera module of claim 12, wherein the image sensor photographs one image from a front image, a rear image or both images of the vehicle.

14. The method for driving an automobile camera module of claim 12, the method further comprising outputting the image composed by the image composition unit to a display unit.

15. The method for driving an automobile camera module of claim 14, wherein the estimated traveling trace is altered in real time in response to changing steering angles of the vehicle and the altered trace is outputted to the display unit.

16. The method for driving an automobile camera module of claim 15, wherein a color in which the estimated traveling trace matches a parking guide line and a color in which the estimated traveling trace does not match the parking guide line are different.

17. A method for guiding a parking, the method comprising:
- selecting any one parking mode from a parallel parking mode and a right angle parking mode;
- selecting a parking site based on the selected parking mode;
- outputting parking guide line information corresponding to the selected parking site and estimated traveling trace information of the vehicle; and
- outputting progressing position information based on back and forth movement of the vehicle,
- wherein the outputting progressing position information comprises:
  - composing, by an image sensor, images stored in a memory and the photographed image;
  - receiving, by a controller, steering angle information of the vehicle to generate an estimated traveling trace of the vehicle; and
  - composing the image composed by the image sensor with the estimated vehicle trace generated by the controller,
- wherein the images stored in the memory include images of a parking mode, a parking direction, a parking guide line, a parking site and a warning message, and
- wherein the parking guide line in the images is based on the parking mode, and the images of the parking guide line and the parking site are provided as fixed images,
- wherein, when the image of the parking site and an actual parking site do not match, a driver can resolve by a steering action so that the image of the parking site and the actual parking site do match,
- wherein the controller calculates coordinates in proportion to a traveling trace of a maximum steering angle, connects each coordinate and generates the estimated traveling trace, and
- wherein the image composition unit is configured with overlay chips, and the composite image is an image composed from the photographed image and the images of the parking guide line and the parking site, on which the estimated traveling trace is overlaid, and
- wherein, when the estimated traveling trace is matched to the parking guide line by manipulation of the steering wheel, the vehicle is parked according to the estimated traveling trace to the parking site.

18. The method for guiding a parking of claim 17, wherein the estimated traveling trace of the vehicle alters and outputs the estimated traveling trace information of the vehicle in real time in response to changing steering angle of the vehicle.

19. The method for guiding a parking of claim 18, wherein color information on the estimated traveling trace is changed and outputted, if the parking guide line and the estimated traveling trace are matched.

* * * * *